United States Patent [19]

Schele

[11] 4,425,994
[45] Jan. 17, 1984

[54] MULTIPLE DISC FRICTION CLUTCH

[75] Inventor: Franz Schele, Argenbühl, Fed. Rep. of Germany

[73] Assignee: Zahnradfabrik Friedrichshafen AG, Friedrichshafen, Fed. Rep. of Germany

[21] Appl. No.: 257,787

[22] Filed: Apr. 27, 1981

[30] Foreign Application Priority Data

Apr. 29, 1980 [DE] Fed. Rep. of Germany ....... 3016463

[51] Int. Cl.³ .................... F16D 25/063; F16D 13/42
[52] U.S. Cl. .............................. 192/85 AA; 192/70.2; 192/101
[58] Field of Search ................. 192/70.2, 70.28, 70.11, 192/85 AA, 101; 188/71.5

[56] References Cited

U.S. PATENT DOCUMENTS

| | | | |
|---|---|---|---|
| 1,617,717 | 2/1927 | Lombard | 192/70.2 X |
| 2,204,807 | 6/1940 | McCune et al. | 188/71.5 X |
| 2,257,877 | 10/1941 | Binder | 192/70.28 |
| 2,738,864 | 3/1956 | Becker | 192/70.2 X |
| 2,827,142 | 3/1958 | Aschauer | 192/70.28 X |
| 3,175,664 | 3/1965 | Ramsel | 192/70.28 |
| 3,446,323 | 5/1969 | Hilpert | 192/70.11 |
| 3,482,668 | 12/1969 | Hilpert | 192/107 R X |
| 3,584,720 | 6/1971 | Bark | 192/70.28 |
| 4,068,747 | 1/1978 | Snoy | 192/70.2 X |

FOREIGN PATENT DOCUMENTS

| | | |
|---|---|---|
| 897344 | 11/1953 | Fed. Rep. of Germany . |
| 1750748 | 5/1974 | Fed. Rep. of Germany . |
| 2742710 | 3/1978 | Fed. Rep. of Germany . |
| 2944578 | 5/1980 | Fed. Rep. of Germany . |
| 1069725 | 7/1954 | France .............................. 192/70.28 |
| 1239886 | 7/1960 | France .............................. 192/70.2 |

Primary Examiner—Rodney H. Bonck
Attorney, Agent, or Firm—Karl F. Ross; Herbert Dubno

[57] ABSTRACT

A multiple-disk clutch of the type in which an outer member rotatably engages a plurality of first disks interleaved with second disks rotatably engaged by an inner member so that the disks are axially displaceable relative to the respective members whereby axial compression of the disk pack or stack will frictionally entrain the disks with one another. According to the invention, disk wobble or flutter is prevented by constraining elements distributed around the periphery of the disk pack and limiting relative axial displacement of the disks in pairs upon deenergization of the clutch. The compressing piston and the end disk are connected directly to the constraining elements or indirectly to the latter via respective supports.

6 Claims, 20 Drawing Figures

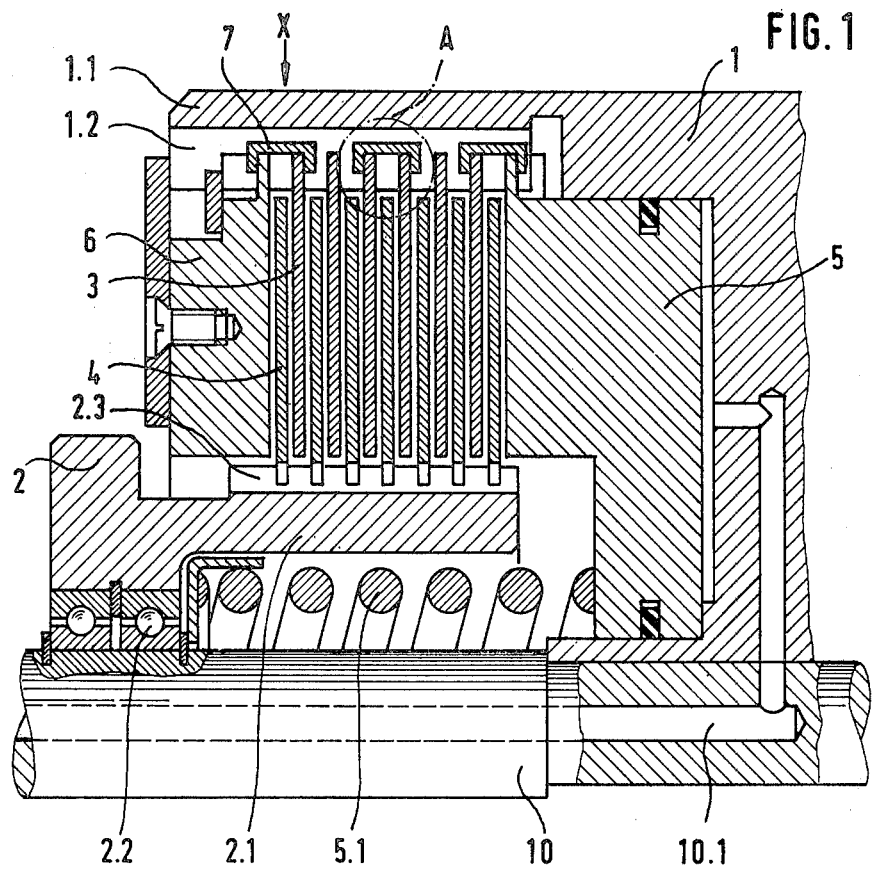
FIG. 1
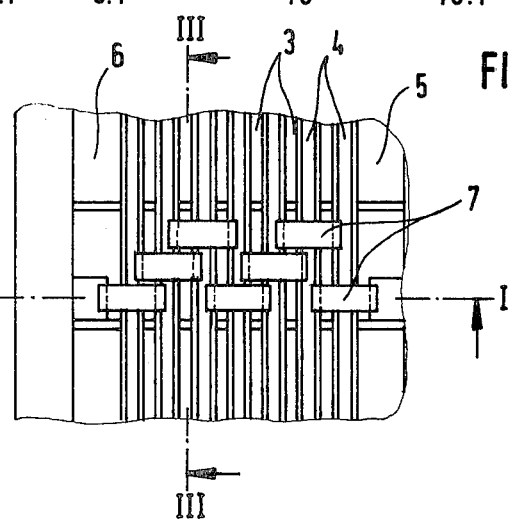
FIG. 2
FIG. 3

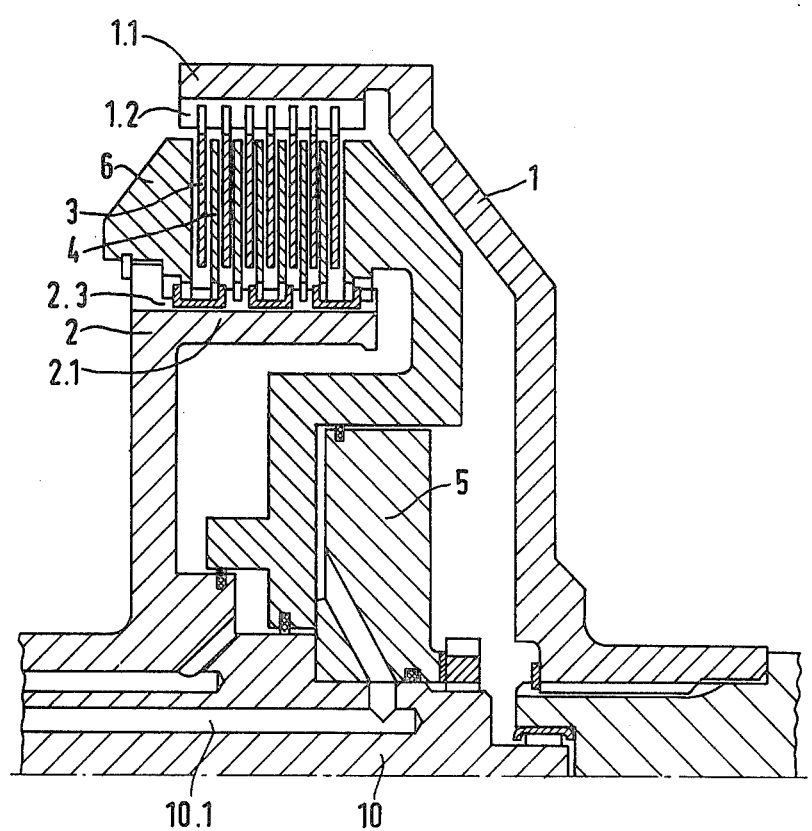

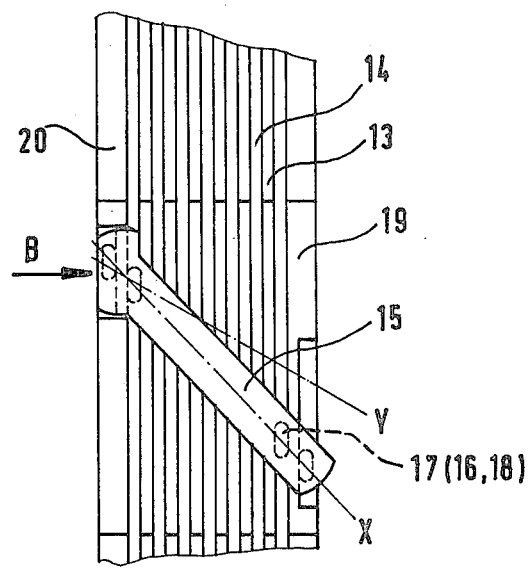
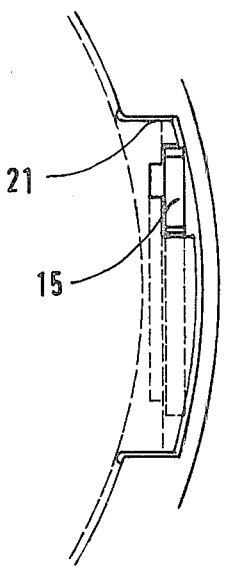
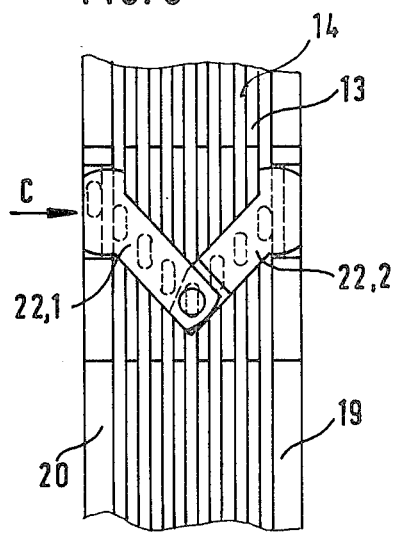
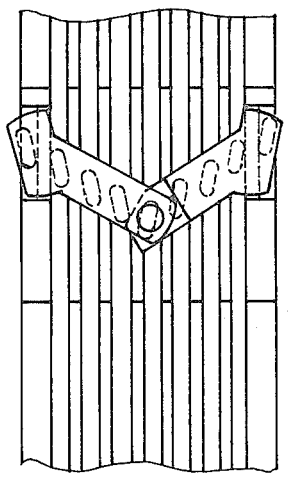
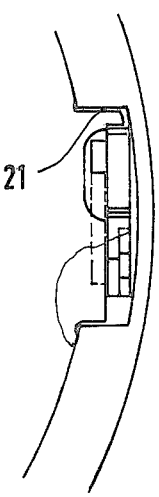

MULTIPLE DISC FRICTION CLUTCH

FIELD OF THE INVENTION

My present invention relates to a friction clutch and, more particularly, to a multiple disk clutch of the type in which a disk pack has alternate friction disks connected to respective members for rotation therewith but wherein the disks are axially displaceable relative to these members by a piston which compresses the pack to bring the disks into frictional interengagement.

BACKGROUND OF THE INVENTION

Multiple disk friction clutches for automotive and other purposes generally comprise an internally toothed or splined outer member and an externally toothed or splined inner member, the two members being relatively rotatable but frictionally interconnectable by a disk pack or stack disposed between the members.

The outer member can have disks which are externally toothed for rotatable entrainment by the outer member, the splines or teeth of the latter enabling axial displacement of these disks. Similarly, the disks of the inner member can be internally toothed for rotatable engagement with the inner member and axial displacement relative thereto. The disks of the inner member are interleaved with the disks of the outer member.

One of the problems with multiple disk clutches of this type is the tendency of the disks to wobble, this movement being termed "disk flutter" and resulting in localized wear, overheating, increased drag or friction and disk distortion when the clutch is disengaged.

There have been various proposals to eliminate or reduce disk flutter. For example, in German patent document No. 17 50 748, it is proposed to subject the disks during operation to the influence of a rotating imbalance produced by centrifugal force, thereby tending to maintain the disks in positions in which they are perpendicular to the axis of rotation.

This arrangement, however, increases the frictional engagement between the disks and the rotating member which increases the force necessary to shift the clutch into its engaged state, i.e. the force required for axial displacement of the disks.

In another system described in German patent document No. 27 42 710, the disks are partly cut away. This, however, has not been found to be fully effective for the purpose.

OBJECTS OF THE INVENTION

It is the principal object of the present invention to provide an improved multiple disk clutch which does not suffer from the drawback enumerated above and in which disk wobble or flutter is eliminated or reduced.

Another object of the invention is to provide a clutch having reduced disk wear in the deenergized position of the clutch members.

SUMMARY OF THE INVENTION

These objects and others which will become apparent hereinafter are attained, in accordance with the present invention, in a clutch of the type described wherein the disks of at least one of the two sets, i.e. of the inner or outer member, are connected together in pairs by constraining elements which bridge the disks of the pairs along a periphery of the sets of disks so that the disks of each are interconnected in a chained relationship.

More particularly, the invention provides a multiple disk clutch which comprises an outer internally toothed member having a set of outer disks or clutch plates rotationally coupled thereto but axially displaceable on this member, an inner externally toothed member rotatable relative to the outer member, another set of disks or plates (inner set) rotationally coupled to the inner member and interleaved with the plates of the outer set, an end plate and a piston disposed on opposite sides of the resulting disk pack and adapted to compress the pack to frictionally interconnect the members, one of which is connected to a drive source while the other is connected to a load, and constraining elements distributed about the periphery of at least one of these sets and interconnecting the disks thereof in pairs, the constraining elements also being connected directly or indirectly to the end plate and to the piston, with lost motion, so as to maintain the disks or plates free from wobble or flutter.

The constraining elements thus act as links forming a chain with the disks of the set to which they are connected and, without interfering with relative axial displacement of the members as the disk pack is compressed, prevent wobble of the disks when the disk pack is expanded in the deenergized condition of the clutch.

According to the invention, the constraining elements can be U-shaped members straddling a pair of plates of the respective sets and disposed in the region of the entrainment teeth or splines of the respective members, i.e. between such teeth and splines. Alternatively, they may be formed as double-headed rivets. The members may be provided with swivel supports inclined at an angle to the axis of rotation of the clutch.

The supports can be swivelably connected to the piston and the end plate and can engage by additional swivels or the like, the disks of the set between the end plate and the piston. Alternatively, a sliding engagement can be provided between these supports and the end plate and/or the piston.

The constraining elements may, for example, have a cam-like, oblong, elongated, curved or circular shape or action so that they bear upon juxtaposed surfaces of pairs of plates of the respective set in the expanded condition of the pack but do not impede compression of the pack.

The system of the invention thus sharply reduces flutter of the plates and disks in the expanded condition of the pack and eliminates drag when the clutch is disengaged.

BRIEF DESCRIPTION OF THE DRAWING

The above and other objects, features and advantages of the present invention will become more readily apparent from the following description, reference being made to he accompanying drawing in which:

FIG. 1 is a longitudinal section through half of a clutch with a compressing piston which moves against a spring, and with constraining elements in the form of U-shaped plates at the periphery of the outer disks;

FIG. 1a is similar to FIG. 1, but with a compressing piston which is moved in and out by means of a pressure medium, and with constraining elements in the form of U-shaped plates at the periphery of the bore in the inner disks;

FIG. 2 is a view of the disk pack in the direction X of FIG. 1;

FIG. 3 is a section on the line III—III of FIG. 2;

FIG. 6 is a plan view of the engaged clutch without the outer disk support, and with constraining elements fixed to a support;

FIG. 7 is a view in the direction B of FIG. 6;

FIG. 8 is a plan view of the engaged clutch without the outer disk support, and with constraining elements fixed to two supports which are hinged together;

FIG. 8a is a plan view of the disengaged clutch;

FIG. 9 is a view in the direction C of FIG. 8;

SPECIFIC DESCRIPTION

Figure 4:
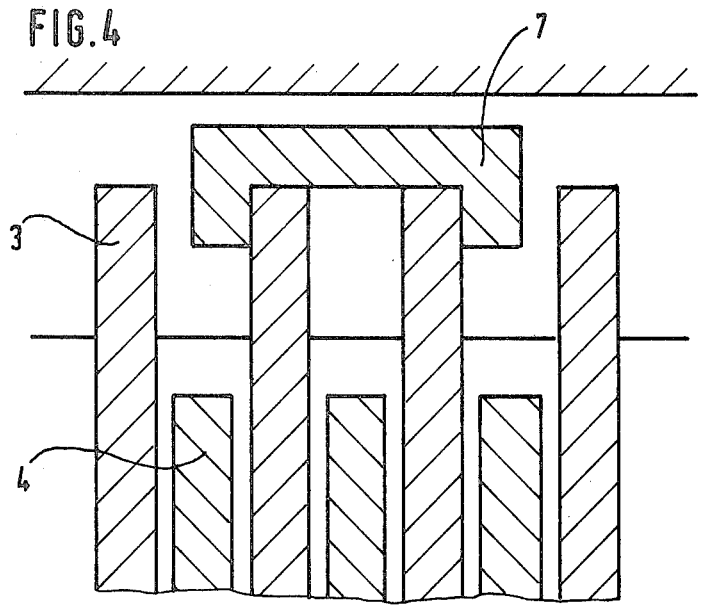
FIG. 4 shows region A of FIG. 1 drawn to an enlarged scale with the clutch disengaged.

FIG. 1 shows a clutch disposed on a shaft 10 together with the clutch housing 1 and its outer disk support 1.1, which comprises inner toothing 1.2. The clutch hub 2 together with the inner disk support 2.1 is rotatably supported on the shaft 10 by means of the bearing 2.2.

The inner disk support 2.1 comprises an external toothing 2.3 for holding the internally-toothed inner disks 4, whereas the externally-toothed outer disks are held by the inner toothing 1.2 of the outer disk support 1.1.

The disk pack, consisting of the outer and inner disks, is disposed between the axially-fixed end plate 6 and the compressing piston 5 which rotates with the outer-disk support.

In order to engage the clutch, the compressing piston 5 is closed against the force of the spring 5.1 by means of a pressure medium from the pressure-medium feed line 10.1. Obviously, the clutch can also be engaged electromagnetically.

The outer disks 3 are connected together at several points around their periphery by means of U-shaped pieces 7, in the manner of a chain, and are joined at one end to the axially-fixed end disk 6 and at the other end to the compressing piston 5. The constraining elements 7 lie loosely in the entrainment toothing 9 of said disks when the clutch is engaged. When the clutch is disengaged, the chain is pulled out uniformly by means of the pistion, which is urged back under the action of the spring 5.1. The outer disks 3 are thus forced into an exactly determined position. Any tilting and thus tendency towards wobbling is obviated in this manner (see FIGS. 2, 3 and 4).

Figure 5:
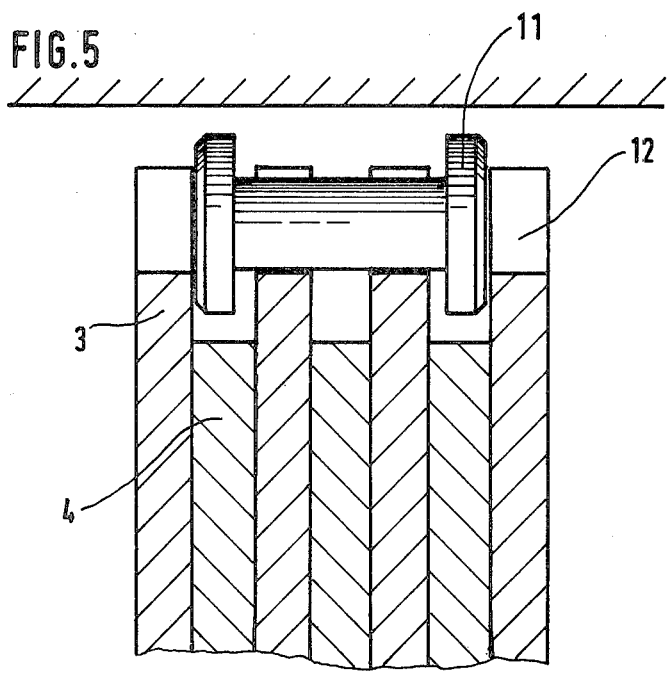
FIG. 5 shows region A of FIG. 1 drawn to an enlarged scale with the clutch disengaged, and with the constraining element in the form of a double rivet.

Instead of the U-shaped pieces 7, double-headed rivets 11 acting as draw pins can be used, these being disposed in corresponding recesses 12 in the disk periphery. Such an arrangement is shown in FIG. 5, with the clutch engaged.

In a further embodiment of the multiple-disk friction clutch with protection against the disk wobble, as shown in FIGS. 6 and 7, constraining elements of cam-shaped or substantially rectangular cross-section are disposed between the outer or inner disks 13 or 14 in the region of the entrainment toothing 21, these elements being fixed on swivel-mounted supports 15 which tie at an angle to the axis of rotation of the clutch.

The one-piece supports are swivel mounted on the compressing piston 20 or on the end disk 19, and are slidably guided on the end disk 19 or on the compressing piston 20, whereby the supports lie in the direction of the line X when the clutch is engaged. When the clutch is disengaged, the supports swivel into the direction Y, whereby the constraining elements assume the position shown in FIG. 10b.

In the embodiment shown in FIG. 8 or FIG. 8a and FIG. 9, the constraining elements are fixed to two supports 22.1 and 22.2 which are hinged together, the free ends of the supports being hinged to the compressing piston 20 and to the end plate 19.

Figure 10A:
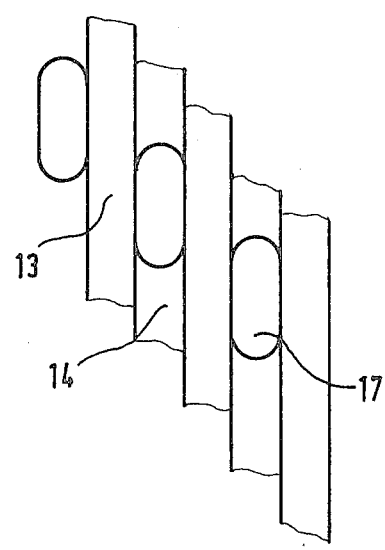
FIG. 10a is a plan view to an enlarged scale of the disks with the clutch engaged, the constraining elements having a cross-section of cam shape or in the shape of a rectangle rounded off in semicircular form.

In FIG. 8, the clutch is engaged, and the constraining elements 17 are in position illustrated in FIG. 10a. In FIG. 8a, the clutch is disengaged, the two supports 22.1 and 22.2 being displaced by the movement of the compressing piston 20 so that the constraining elements 17 assume the position illustrated in FIG. 10b.

Figure 10B:
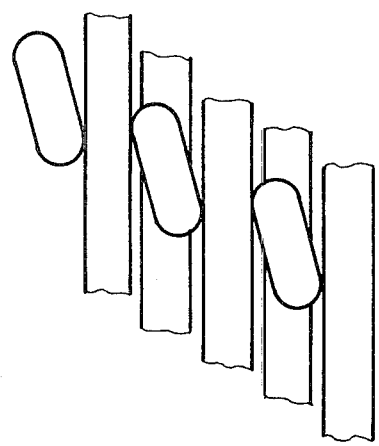
FIG. 10b is a plan view, similar to FIG. 10a, with the clutch disengaged.
Figure 13:
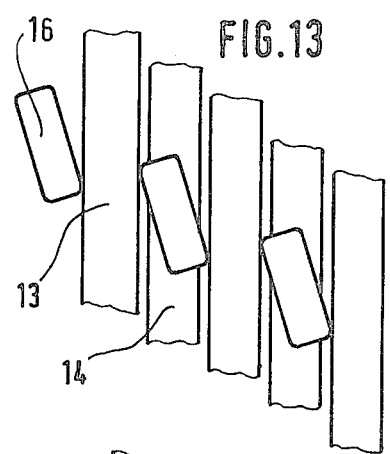
FIG. 13 is a plan view to an enlarged scale of the disks with the clutch disengaged showing cam-shaped or rectangular constraining elements.

Various forms of cross-section can be chosen for the constraining elements. Thus, in FIG. 13, support elements of rectangular form are chosen, their corners being only slightly rounded. Obviously, the short sides of the rectangle can also be in the form of circular arcs, as shown in FIG. 10a and FIG. 10b.

Figure 11A:
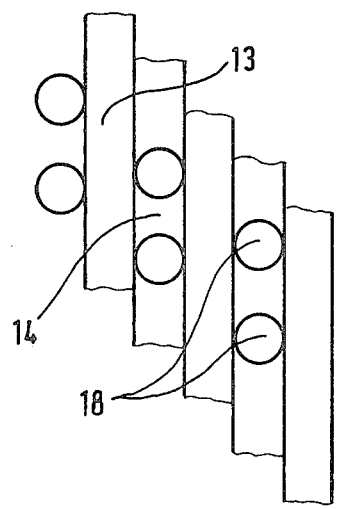
FIG. 11a is a plan view to an enlarged scale of the disks with the clutch engaged, two pins of circular cross-section acting as constraining elements.
Figure 11B:
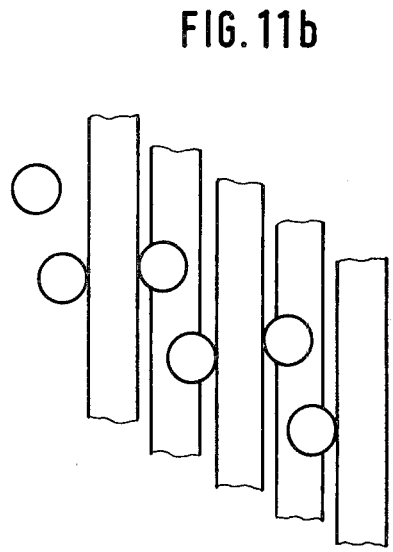
FIG. 11b is a plan view, similar to FIG. 11a, with the clutch disengaged.

In FIGS. 11a and 11b, two respective pins 18 of circular cross-section are chosen as the constraining elements.

Figure 12A:
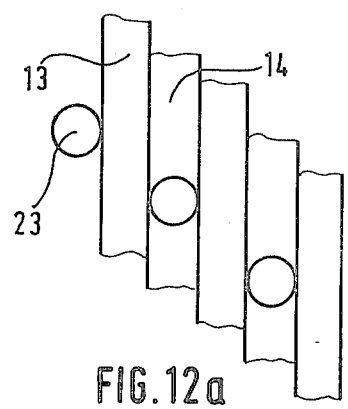
FIG. 12a is a plan view to an enlarged scale of the disks with the clutch engaged, this latter comprising a pin as the constraining element.
Figure 12B:
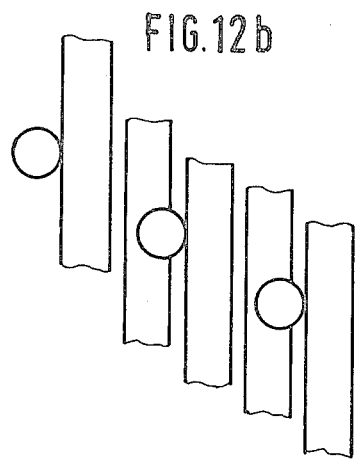
FIG. 12b is a plan view, similar to FIG. 12a, with the clutch disengaged.

In FIGS. 12a and 12b, the constraining elements are in the form of single pins 23, which also limit disk wobble when the clutch is disengaged by means of single sided contact, as shown in FIG. 12b. This means for preventing disk wobble is however sufficient in most cases.

Figure 14:
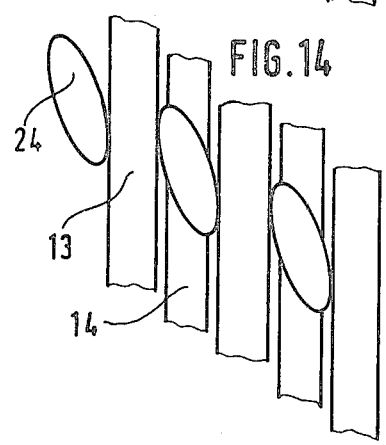
FIG. 14 is a plan view to an enlarged scale of the disks with the clutch disengaged showing cam-shaped or oval, or ellipse-shaped constraining elements.

FIG. 14, constraining elements 24 of oval or elliptical cross-section are provided, which have further advantages over the semi-circular rounded constraining elements 17 or FIG. 10, particularly when the clutch is engaged.

Figure 15:
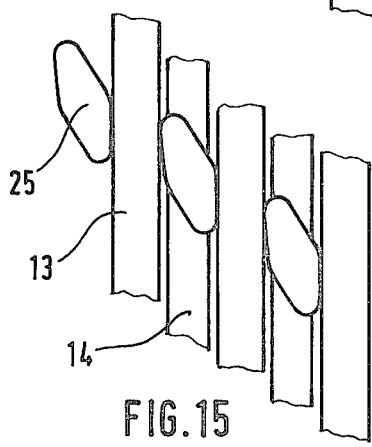
FIG. 15 is a plan view to an enlarged scale of the disks with the clutch disengaged, this latter comprising cam-shaped or rhombus-shaped constraining elements.

Finally, it is also possible for the constraining elements to have a rhombus-like shape, as shown in FIG. 15.

By virtue of the return force on the closing piston 5 generated by the spring 5.1 of FIG. 1, the clutch disks become fixed positively by means of the constraining elements, which can have the various forms shown, whereas the previously known methods use centrifugal force for maintaining the disks erect.

I claim:

1. A multiple-disk friction clutch comprising:

an internally toothed outer clutch member;

an externally toothed inner clutch member rotatable relatively to said outer clutch member and surrounded thereby, one of said clutch members being connectible to a drive and the other of said members being connectible to a load;

a disk pack disposed between said members and including a first set of externally toothed friction disks rotationally entrained with said outer clutch member and engaging the teeth thereof but axially displaceable relative to one another and a second set of internally toothed disks interleaved with the disks of said first set and rotationally entrained with said inner member but axially shiftable thereon;

an annular piston on a first of said clutch members fluid pressurizable to compress said disk pack at one side thereof;

an end plate on said one of said members disposed along an opposite side of said pack whereby said piston upon energization of the clutch compresses said pack against said end plate;

a plurality of constraining elements distributed around the periphery of said disk pack and engaging the disks of at least one of said sets in pairs, at least upon deenergization of the clutch whereby said constraining elements form an extensible and contractible chain with the disks of said one of said sets to prevent flutter thereof; and means for connecting said chain to said piston and said plate, said constraining elements being disposed between the disks of the respective pair and fixed on swivel-mounted supports inclined to the axis of the clutch.

2. The clutch defined in claim 1 wherein a single support element extends across said pack and said support is swivelably connected at one end to one of said piston and said plate and is slidably connected at the other end of said element to the other of said plate and said piston.

3. The clutch defined in claim 1 wherein each support comprises two elongated elements hinged together, the opposite ends of said support being pivotally connected to said plate and to said piston.

4. The clutch defined in claim 1, claim 2 or claim 3 wherein said camming elements have a rounded oblong shape for camming the plates of said pairs apart upon deenergization of said clutch.

5. The clutch defined in claim 1, claim 2 or claim 3 wherein a pair of circular-cross section pins forms the constraining element between each of said pairs of plates.

6. The clutch defined in claim 1, claim 2 or claim 3 wherein a respective pin is disposed between each of said pairs of plates, said pins forming said constraining elements.

* * * * *